(12) United States Patent
Lambert et al.

(10) Patent No.: US 11,249,935 B1
(45) Date of Patent: Feb. 15, 2022

(54) SINGLE- AND MULTI-CHANNEL, MULTI-LATENCY PAYLOAD BUS

(71) Applicant: Dell Products L.P., Round Rock, TX (US)

(72) Inventors: Timothy M. Lambert, Austin, TX (US); Shawn J. Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/142,944

(22) Filed: Jan. 6, 2021

(51) Int. Cl.
*G06F 13/42* (2006.01)
*G06F 13/40* (2006.01)
*G06F 13/38* (2006.01)

(52) U.S. Cl.
CPC ........ *G06F 13/4226* (2013.01); *G06F 13/405* (2013.01); *G06F 13/4031* (2013.01); *G06F 13/382* (2013.01)

(58) Field of Classification Search
CPC .. G06F 13/382; G06F 13/405; G06F 13/4031; G06F 13/4226

USPC ........................................................ 710/305
See application file for complete search history.

(56) References Cited

U.S. PATENT DOCUMENTS

| | | | | |
|---|---|---|---|---|
| 9,606,928 | B2* | 3/2017 | Eguchi | G11C 8/12 |
| 10,585,816 | B1* | 3/2020 | Lambert | G06F 1/3215 |
| 2015/0241204 | A1* | 8/2015 | Steffey | G01S 7/4817 |
| | | | | 356/4.01 |
| 2018/0150410 | A1* | 5/2018 | Dimer | H04L 9/0816 |

* cited by examiner

*Primary Examiner* — Brian T Misiura
(74) *Attorney, Agent, or Firm* — Jackson Walker L.L.P.

(57) ABSTRACT

A system may include a first device and a second device communicatively coupled to the first device via a communications bus, wherein the communications bus comprises a single clock line for transmission of a clock signal from the first device to the second device, a single frame line for transmission of a frame alignment signal from the first device to the second device, and at least one communications channel for serialized communication of payloads of data between the first device and the second device, wherein the payloads of data have at least two different latencies.

15 Claims, 4 Drawing Sheets

SINGLE- AND MULTI-CHANNEL, MULTI-LATENCY PAYLOAD BUS

TECHNICAL FIELD

The present disclosure relates in general to information handling systems, and more particularly to methods and systems for detection of a root of trust bypass implant and remediation upon such detection.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include numerous electronic components, many of such components communicatively coupled to one another via one or more communications buses. Density limitations, cost limitations, and desired modularity often require serialization of control and data information between components. Further, a number of pins on each component may be a critically-limited resource in many inter-circuit board topologies. In addition, communication of data among components may include communication at different latencies and priority.

SUMMARY

In accordance with the teachings of the present disclosure, the disadvantages and problems associated with existing approaches to detection of a root of trust bypass implant and remediation upon such detection in an information handling system may be reduced or eliminated.

In accordance with embodiments of the present disclosure, a system may include a first device and a second device communicatively coupled to the first device via a communications bus, wherein the communications bus comprises a single clock line for transmission of a clock signal from the first device to the second device, a single frame line for transmission of a frame alignment signal from the first device to the second device, and at least one communications channel for serialized communication of payloads of data between the first device and the second device, wherein the payloads of data have at least two different latencies.

In accordance with these and other embodiments of the present disclosure, a method may include, in a system including a first device and a second device communicatively coupled to the first device via a communications bus, wherein the communications bus comprises a single clock line, a single frame line, and at least one communications channel: transmitting a clock signal on the single clock line from the first device to the second device, transmitting a frame alignment signal on the single frame line from the first device to the second device, and performing serialized communication of payloads of data between the first device and the second device via the at least one communications channel, wherein the payloads of data have at least two different latencies.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to, in a system including a first device and a second device communicatively coupled to the first device via a communications bus, wherein the communications bus comprises a single clock line, a single frame line, and at least one communications channel: transmit a clock signal on the single clock line from the first device to the second device, transmit a frame alignment signal on the single frame line from the first device to the second device, and perform serialized communication of payloads of data between the first device and the second device via the at least one communications channel, wherein the payloads of data have at least two different latencies.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
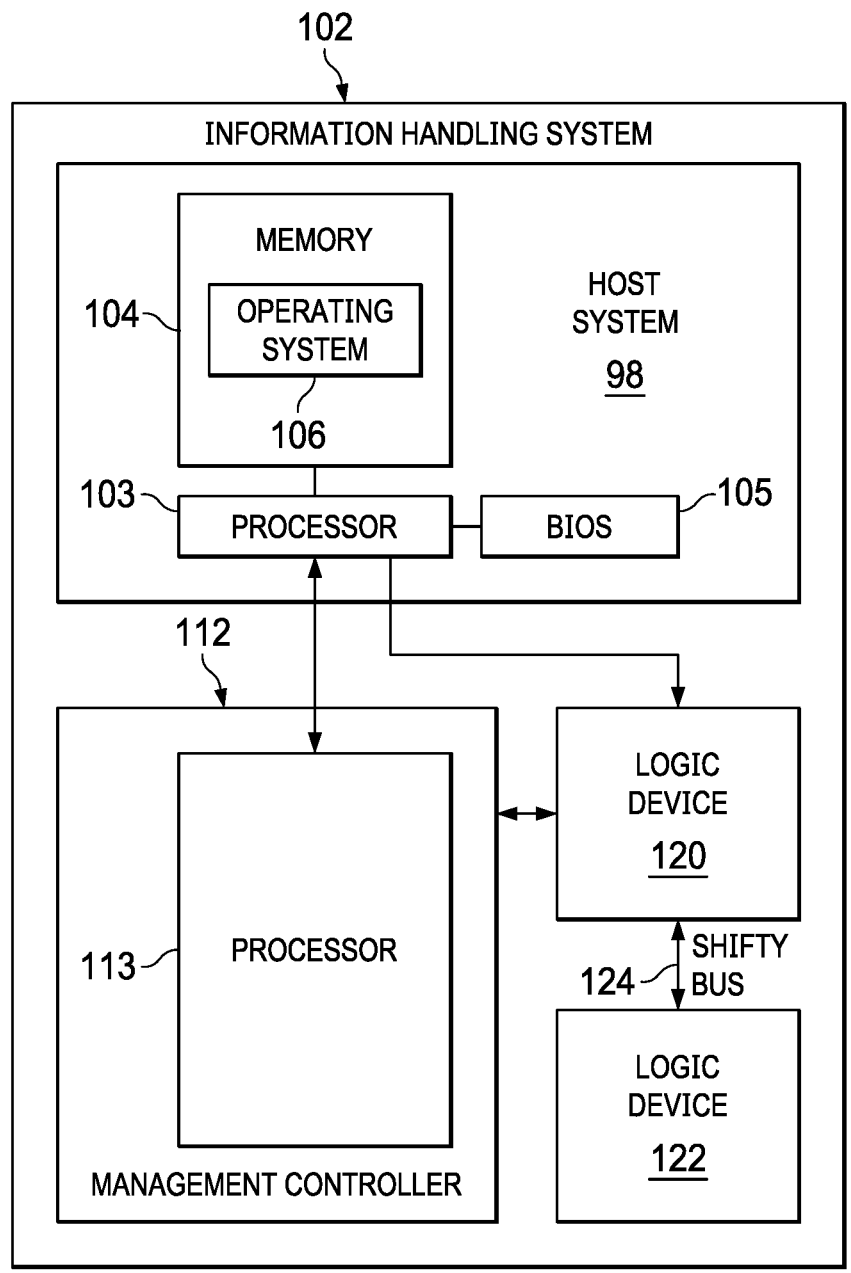
FIG. 1 illustrates a block diagram of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

U.S. patent application Ser. No. 17/011,583 filed on Sep. 3, 2020 (the '583 Application), incorporated herein by reference in its entirety, discloses an information handling system that may include a management controller (e.g., a baseboard management controller) that boots in response to an alternating current (AC) power cycle event, provides a management controller ready signal in response to the boot, establishes the management controller as a root of trust for the processor in response to providing the management controller ready signal, and provides a processor boot indication in response to establishing the management controller as the root of trust. Furthermore, in the '583 Application, a processor may boot to an operating system in response to the processor boot indication instead of in response to the AC power cycle. Also in the '583 Application, a logic device may determine that the management controller failed to provide the management controller ready signal, determine that the management controller failed to boot in response to the AC power cycle and determine that the baseboard management controller (BMC) failed to provide the management controller ready signal, and provide a power-on reset signal to the management controller in response to determining that the BMC failed to boot. The '583 Application also contemplates a setting in the logic device to provide for a "no brick" boot of the operating system when the management controller has repeatedly failed to successfully boot through multiple successive timeouts of a watchdog timer of the logic device (e.g., three or more times in succession).

A potential disadvantage of the '583 Application is that a malicious actor could implant a bypass mechanism (e.g., in the form of a small, highly undetectable microchip) to delay reset of the management controller, which may in turn delay boot of the management controller such that the management controller fails to boot after multiple successive timeouts of the watchdog timer of the logic device. If the logic device is configured to do so, the failure of the management controller to boot after multiple successive timeouts of the watchdog timer of the logic device may cause the operating system of the information handling system to boot without the management controller providing hardware root of trust to executable code of a basic input/output system (BIOS), and as such, unverified BIOS and operating system code may execute, potentially allowing a malicious actor to perpetrate an attack through BIOS or the operating system code.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 105 communicatively coupled to processor 103, a management controller 112 communicatively coupled to processor 103, a logic device 120 communicatively coupled to processor 103 and communicatively coupled to management controller 112, and a logic device 122 communicatively coupled to logic device 122 via a shifty bus 124. In operation, processor 103, memory 104, and BIOS 105 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in FIG. 1 as stored in memory 104, in some embodiments, operating system 106 may be stored in storage media accessible to processor 103, and active portions of operating system 106 may be transferred from such storage media to memory 104 for execution by processor 103.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be stored on a read-only memory of information handling system 102 and which may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be configured to provide management facilities for management of information handling system 102. Such management may be made by management controller 112 even if information handling system 102 is powered off or powered to a standby state. Management controller 112 may include a processor 113 communicatively coupled to processor 103. In certain embodiments, management controller 112 may include or may be an integral part of a baseboard management controller (BMC) or a remote access controller (e.g., a Dell Remote Access Controller or Integrated Dell Remote Access Controller). In these and other embodiments, management controller 112 may be referred to as a service processor or access controller.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in computer-readable media of information handling system 102 or management controller 112. As shown in FIG. 1, processor 113 may be communicatively coupled to processor 103. Such coupling may be via a Universal Serial Bus (USB), System Management Bus (SMBus), general purpose input/output (GPIO) channel and/or one or more other communications channels.

Logic device 120 may comprise any suitable system, device, or apparatus that may perform a specialized function that extends the functionality of information handling system 102. For example, logic device 120 may serve as an interface between management controller 112 and other subsystems of information handling system 102, such interface for communication of control information associated with such subsystems. In some embodiments, logic device 120 may comprise a complex programmable logic device (CPLD) or a field-programmable gate array (FPGA).

Logic device 122 may comprise any suitable system, device, or apparatus that may perform a specialized function that extends the functionality of information handling system 102. For example, logic device 122 may serve as an interface between management controller 112 and other subsystems of information handling system 102, such interface for communication of control information associated with such subsystems. For example, logic device 120 may comprise a primary logic device and logic device 122 may comprise a secondary logic device, and together logic devices 120 and 122 may serve as a shift register for data. In some embodiments, logic device 122 may comprise a CPLD or FPGA.

Figure 2:
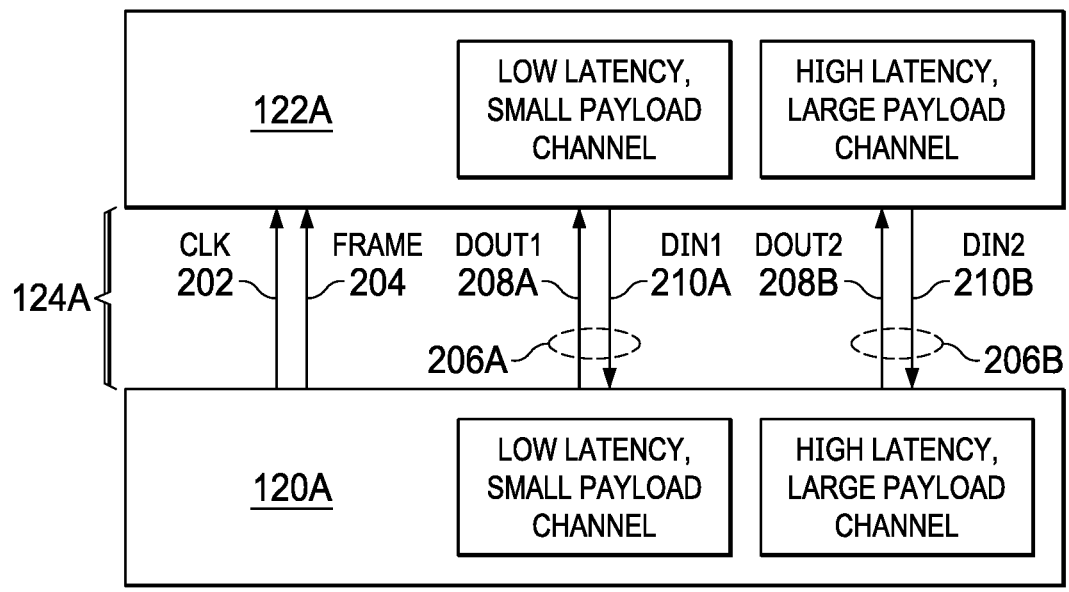
FIG. 2 illustrates a block diagram of example logic devices and an example multi-channel, multi-latency payload bus coupled between the logic devices, in accordance with embodiments of the present disclosure.
Figure 4:
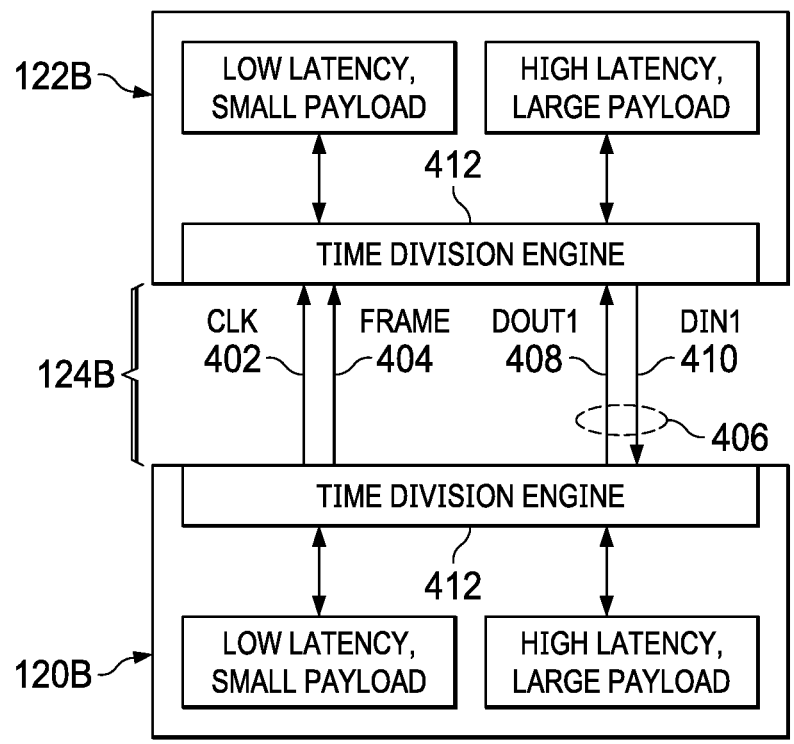
FIG. 4 illustrates a block diagram of example logic devices and an example single-channel, multi-latency payload bus coupled between the logic devices, in accordance with embodiments of the present disclosure.

Shifty bus 124 may comprise any suitable communications bus for communicating control signals and data between logic device 120 and logic device 122, in accordance with embodiments of the present disclosure. In some embodiments, shifty bus 124 may comprise a multi-channel, multi-latency payload bus, for example as shown in FIG. 2. In other embodiments, shifty bus 124 may comprise a single-channel, multi-latency payload bus, for example as shown in FIG. 4.

FIG. 2 illustrates a block diagram of example logic devices 120A and 122A and an example multi-channel, multi-latency payload bus 124A coupled between the logic devices 120A and 122A in accordance with embodiments of the present disclosure. As shown in FIG. 2, multi-channel, multi-latency payload bus 124A may comprise a clock line 202 for communication of a clock signal CLK from logic device 120A to logic device 122A and a frame line 204 for communication of a frame signal FRAME from logic device 120A to logic device 122A. As further shown in FIG. 2, multi-channel, multi-latency payload bus 124A may also include a plurality of channels 206, including at least a first channel 206A and a second channel 206B. First channel 206A may be configured to communicate data of a first payload size and at a first latency between logic device 120A and logic device 122A. Second channel 206B may be configured to communicate data of a second payload size larger than the first payload size and at a second latency higher than the first latency between logic device 120A and logic device 122A. As shown, each channel 206 may include a data out line 208 (e.g., data out lines 208A, 208B) for transmission of serialized data (e.g., data out DOUT1 and data out DOUT2) from logic device 120A to logic device 122A in accordance with the respective payload sizes and latency sizes of channels 206. Further, each channel 206 may include a data in line 210 (e.g., data in lines 210A, 210B) for transmission of serialized data (e.g., data in DIN1 and data in DIN2) from logic device 122A to logic device 120A in accordance with the respective payload sizes and latency sizes of channels 206.

Although only two channels 206 are depicted in FIG. 2, it is understood that multi-channel, multi-latency payload bus 124A may, in some embodiments, include more than two channels 206, wherein each channel is configured to communicate data at a respective payload size and latency.

Figure 3:
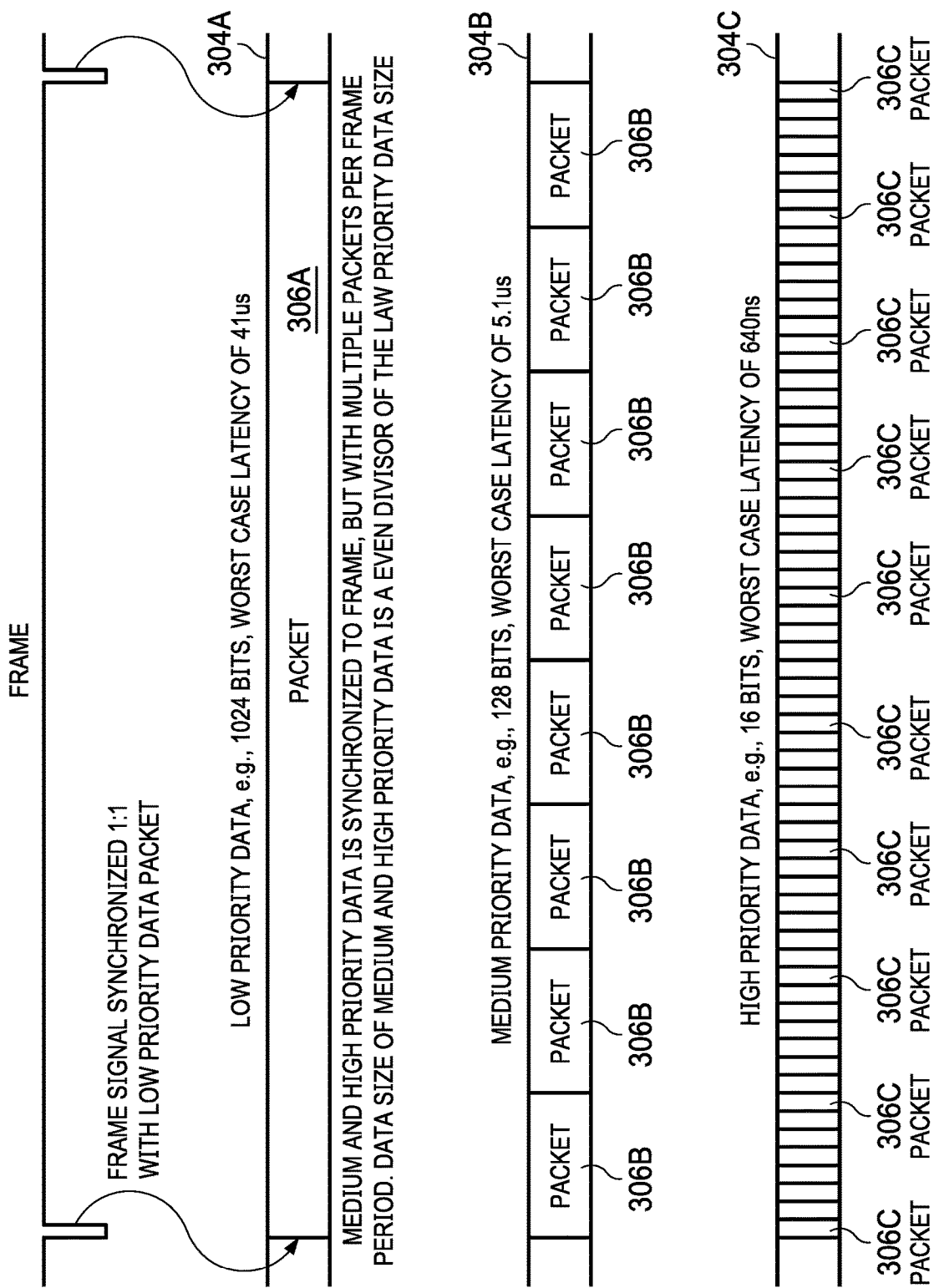
FIG. 3 illustrates example datagrams for communication over the payload bus of FIG. 2, in accordance with embodiments of the present disclosure.

FIG. 3 illustrates example datagrams for communication over multi-channel, multi-latency payload bus 124A of FIG. 2, in accordance with embodiments of the present disclosure. In particular, FIG. 3 illustrates an example FRAME signal, a low-priority data frame 304A comprising a single low-priority packet 306A (e.g., a 1024-bit packet), a medium-priority data frame 304B comprising a plurality of medium-priority packets 306B (e.g., 128-bit packets), and a high-priority data frame 304C comprising a plurality of high-priority packets 306C (e.g., 16-bit packets). Thus, in the example of FIG. 3 in which three frames are simultaneously communicated, multi-channel, multi-latency payload bus 124A may comprise three channels 206 (i.e., instead of the two channels 206 shown in FIG. 2). As shown, logic devices 120A and 122A and multi-channel, multi-latency payload bus 124A may be configured such that frame signal FRAME is synchronized one a one-to-one basis with low-priority data frame 304A and, consequently, synchronized on a one-to-one basis with low-priority data packet 306A. Further, frame signal FRAME may synchronized on a one-to-one basis with medium-priority data frame 304B and high-priority data frame 306C, but medium-priority data frame 304B and high-priority data frame 304C may each have multiple packets 306B and 306C in each period of frame signal FRAME. Thus, packet size of low-priority data packet 306A may be a multiple of both packet size of medium-priority packets 306B and packet size of high-priority packets 306C.

Thus, multi-channel, multi-latency payload bus 124A may provide for a shared clock signal CLK and frame signal FRAME for a plurality of channels 206 each with different latency, each channel 206 dedicated to a respective latency, thus providing minimal latency for each payload tier. Further, each channel 206 may have its own independent cyclic redundancy check within frames 304A, 304B, and 304C.

FIG. 4 illustrates a block diagram of example logic devices 120B and 122B and an example single-channel, multi-latency payload bus 124B coupled between the logic devices 120B and 122B, in accordance with embodiments of the present disclosure. As shown in FIG. 4, single-channel, multi-latency payload bus 124B may comprise clock line 402 for communication of a clock signal CLK from logic device 120B to logic device 122B and a frame line 404 for communication of a frame signal FRAME from logic device 120B to logic device 122B. As further shown in FIG. 4, single-channel, multi-latency payload bus 124B may also include a single channel 406. Channel 406 may be configured to communicate data of multiple latencies between logic device 120B and logic device 122B. As shown, channel 406 may include a data out line 408 for transmission of serialized data (e.g., data out DOUT1) from logic device 120B to logic device 122B. Further, channel 406 may include a data in line 410 for transmission of serialized data (e.g., data in DIN1) from logic device 122B to logic device 120B. In operation, channel 406 may operate to communicate multiple indexed payloads of varying latency in each frame, as described in greater detail below.

Figure 5:
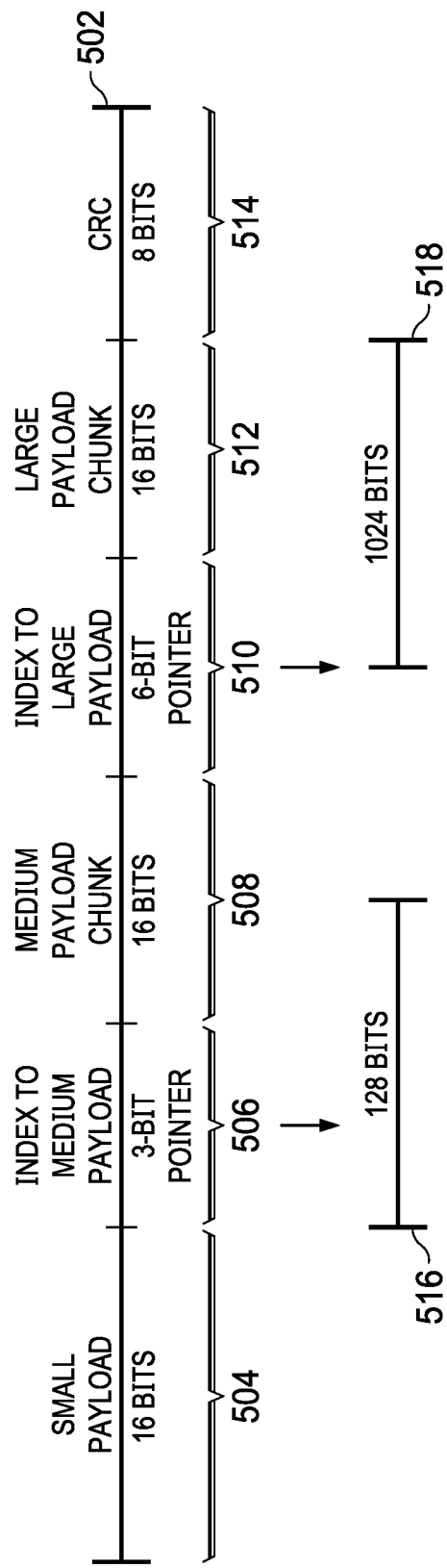
FIG. 5 illustrates an example frame for communication over the payload bus of FIG. 4, in accordance with embodiments of the present disclosure.

FIG. 5 illustrates an example frame 502 for communication over single-channel, multi-latency payload bus 124B of FIG. 4, in accordance with embodiments of the present disclosure. As shown in FIG. 5, each frame 502 may include a small payload field 504 (e.g., 16 bits), an index to medium payload field 506 (e.g., 3 bits), a medium payload chunk 508 (e.g., 16 bits), an index to large payload field 510 (e.g., 6 bits), a large payload chunk 512 (e.g., 16 bits), and a cyclic redundancy check (CRC) field 514 (e.g., 8 bits). Frames 502 as shown in FIG. 5 may be transmitted between logic device 120B and logic device 122B to communicate data payloads of three different latencies: a first latency with a payload of a first size (e.g., 16 bits), a second latency higher than the first latency with a payload of a second size greater than the first size (e.g., 128 bits), and a third latency higher than the second latency with a payload of a third size greater than the second size.

In each frame 502, a payload of the first latency may be transmitted in small payload field 504. On the other hand, only a portion of each of the second-latency and third-latency payloads may be transmitted in each frame.

A full second-latency payload 516 may be transmitted over a series of frames 502, each frame 502 carrying a medium payload chunk 508, wherein a position of such medium payload chunk 508 of second-latency payload 516 may be indicated by index to medium payload field 506.

Similarly, a full third-latency payload 518 may be transmitted over a series of frames 502, each frame 502 carrying a large payload chunk 512, wherein a position of such large payload chunk 512 of third-latency payload 518 may be indicated by index to large payload field 510.

CRC field 514 may include cyclic redundancy check and/or other suitable error checking for frame 502.

To generate frame 502, each of logic device 120B and logic device 122B may include a time division engine 412 comprising logic for time-division multiplexing the various latency payloads into a frame 502 for transmission and demultiplexing the various latency payloads after receipt of a frame 502.

Single-channel, multi-latency payload bus 124B may provide for a communication bus with only four total signals, regardless of a number latency tiers. Single-channel, multi-latency payload bus 124B may also support elastic medium- and high-latency payloads.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
a first device; and
a second device communicatively coupled to the first device via a communications bus, wherein the communications bus comprises:
  a single clock line for transmission of a clock signal from the first device to the second device;
  a single frame line for transmission of a frame alignment signal from the first device to the second device; and
  a single communications channel for serialized communication of payloads of data between the first device and the second device, wherein the payloads of data have at least two different latencies; and
wherein the first device and the second device are configured to generate a plurality of frames for communication of the payloads of data onto the single communications channel, each frame comprising:
  a first payload, the first payload having a first latency;
  a portion of a second payload, the second payload having a second latency wherein the second latency is longer than the first latency; and
  an index identifying a position of the portion of the second payload within the second payload.

2. The system of claim 1, wherein each frame further comprises:
  a portion of a third payload, the third payload having a third latency wherein the third latency is longer than the second latency; and
  a second index identifying a position of the portion of the third payload within the third payload.

3. A system of comprising:
a first device; and
a second device communicatively coupled to the first device via a communications bus, wherein the communications bus comprises:
  a single clock line for transmission of a clock signal from the first device to the second device;
  a single frame line for transmission of a frame alignment signal from the first device to the second device; and
  a plurality of communications channels, comprising at least a first communications channel and a second communications channel, for serialized communication of payloads of data between the first device and the second device, wherein the payloads of data have at least two different latencies; and
wherein the first device and the second device are configured to generate:
  a plurality of first-latency frames for communication onto the first communications channel, each first-latency frame comprising a single first-latency packet of data having a first latency; and
  a plurality of second-latency frames for communication onto the second communications channel, each second-latency frame comprising a plurality of second-latency packets of data having a second latency lower than the first latency;
  wherein each first-latency frame and each second-latency frame is aligned to the frame signal.

4. The system of claim 3, wherein a first bit-width of each first-latency packet is a multiple of a second bit-width of each second-latency packet.

5. The system of claim 3, wherein:
the plurality of communications channels further comprises at least a third communications channel; and
the first device and the second device are configured to generate:
  a plurality of third-latency frames for communication onto the third communications channel, each third-latency frame comprising a plurality of third-latency packets of data having a third latency lower than the second latency;
  wherein each third-latency frame is aligned to the frame alignment signal.

6. A method comprising, in a system including a first device and a second device communicatively coupled to the first device via a communications bus, wherein the communications bus comprises a single clock line, a single frame line, and a single communications channel:
  transmitting a clock signal on the single clock line from the first device to the second device;
  transmitting a frame alignment signal on the single frame line from the first device to the second device;
  performing serialized communication of payloads of data between the first device and the second device via the single communications channel, wherein the payloads of data have at least two different latencies; and
  generating a plurality of frames for communication of the payloads of data onto the single communications channel, each frame comprising:
    a first payload, the first payload having a first latency;

a portion of a second payload, the second payload having a second latency wherein the second latency is longer than the first latency; and
an index identifying a position of the portion of the second payload within the second payload.

7. The method of claim 6, wherein each frame further comprises:
a portion of a third payload, the third payload having a third latency wherein the third latency is longer than the second latency; and
a second index identifying a position of the portion of the third payload within the third payload.

8. A method comprising, in a system including a first device and a second device communicatively coupled to the first device via a communications bus, wherein the communications bus comprises a single clock line, a single frame line, and a plurality of communications channels comprising at least a first communications channel and a second communications channel:
transmitting a clock signal on the single clock line from the first device to the second device;
transmitting a frame alignment signal on the single frame line from the first device to the second device; and
performing serialized communication of payloads of data between the first device and the second device via the plurality of communications channels, wherein the payloads of data have at least two different latencies; and
generating:
a plurality of first-latency frames for communication onto the first communications channel, each first-latency frame comprising a single first-latency packet of data having a first latency; and
a plurality of second-latency frames for communication onto the second communications channel, each second-latency frame comprising a plurality of second-latency packets of data having a second latency lower than the first latency;
wherein each first-latency frame and each second-latency frame is aligned to the frame signal.

9. The method of claim 8, wherein a first bit-width of each first-latency packet is a multiple of a second bit-width of each second-latency packet.

10. The method of claim 8, wherein:
the plurality of communications channels comprises at least a third communications channel; and
the method further comprises generating:
a plurality of third-latency frames for communication onto the third communications channel, each third-latency frame comprising a plurality of third-latency packets of data having a third latency lower than the second latency;
wherein each third-latency frame is aligned to the frame alignment signal.

11. An article of manufacture, comprising:
a non-transitory computer-readable medium; and
computer-executable instructions carried on the computer-readable medium, the instructions readable by a processing device, the instructions, when read and executed, for causing the processing device to, in a system including a first device and a second device communicatively coupled to the first device via a communications bus, wherein the communications bus comprises a single clock line, a single frame line, a single communications channel:
transmit a clock signal on the single clock line from the first device to the second device;
transmit a frame alignment signal on the single frame line from the first device to the second device; and
perform serialized communication of payloads of data between the first device and the second device via the at least one communications channel, wherein the payloads of data have at least two different latencies; and
generate a plurality of frames for communication of the payloads of data onto the single communications channel, each frame comprising:
a first payload, the first payload having a first latency;
a portion of a second payload, the second payload having a second latency wherein the second latency is longer than the first latency; and
an index identifying a position of the portion of the second payload within the second payload.

12. The article of claim 11, wherein each frame further comprises:
a portion of a third payload, the third payload having a third latency wherein the third latency is longer than the second latency; and
a second index identifying a position of the portion of the third payload within the third payload.

13. An article of manufacture, comprising:
a non-transitory computer-readable medium; and
computer-executable instructions carried on the computer-readable medium, the instructions readable by a processing device, the instructions, when read and executed, for causing the processing device to, in a system including a first device and a second device communicatively coupled to the first device via a communications bus, wherein the communications bus comprises a single clock line, a single frame line, and a plurality of communications channels comprising at least a first communications channel and a second communications channel:
transmit a clock signal on the single clock line from the first device to the second device;
transmit a frame alignment signal on the single frame line from the first device to the second device;
perform serialized communication of payloads of data between the first device and the second device via the at least one communications channel, wherein the payloads of data have at least two different latencies; and
generate:
a plurality of first-latency frames for communication onto the first communications channel, each first-latency frame comprising a single first-latency packet of data having a first latency; and
a plurality of second-latency frames for communication onto the second communications channel, each second-latency frame comprising a plurality of second-latency packets of data having a second latency lower than the first latency;
wherein each first-latency frame and each second-latency frame is aligned to the frame signal.

14. The article of claim 13, wherein a first bit-width of each first-latency packet is a multiple of a second bit-width of each second-latency packet.

15. The article of claim 13, wherein:
the plurality of communications channels comprises at least a third communications channel; and
the instructions are for further causing the processing device to generate:

a plurality of third-latency frames for communication onto the third communications channel, each third-latency frame comprising a plurality of third-latency packets of data having a third latency lower than the second latency;

wherein each third-latency frame is aligned to the frame alignment signal.

\* \* \* \* \*